(12) United States Patent
Sjunnesson et al.

(10) Patent No.: US 8,459,942 B2
(45) Date of Patent: Jun. 11, 2013

(54) GAS TURBINE ENGINE COMPONENT, A TURBOJET ENGINE PROVIDED THEREWITH, AND AN AIRCRAFT PROVIDED THEREWITH

(75) Inventors: Anders Sjunnesson, Trollhättan (SE); Niklas Jansson, Mölndal (SE); Robert Reimers, Uddevalla (SE); Rickard Samuelsson, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 924 days.

(21) Appl. No.: 12/593,925

(22) PCT Filed: Mar. 28, 2008

(86) PCT No.: PCT/SE2008/000229
§ 371 (c)(1),
(2), (4) Date: Sep. 30, 2009

(87) PCT Pub. No.: WO2008/121047
PCT Pub. Date: Oct. 9, 2008

(65) Prior Publication Data
US 2010/0111685 A1    May 6, 2010

(30) Foreign Application Priority Data
Mar. 30, 2007  (SE) ...................................... 0700823

(51) Int. Cl.
*F01D 9/04* (2006.01)
(52) U.S. Cl.
USPC .................. 415/191; 415/209.3; 415/200

(58) Field of Classification Search
USPC .................. 415/191, 142, 211.2, 200, 209.3, 415/209.4
See application file for complete search history.

(56) References Cited

U.S. PATENT DOCUMENTS

| 4,832,568 A | * | 5/1989 | Roth et al. ..................... 415/189 |
| 4,987,736 A | * | 1/1991 | Ciokajlo et al. ................ 60/797 |
| 5,236,303 A | | 8/1993 | Fowler et al. |

(Continued)

FOREIGN PATENT DOCUMENTS

| EP | 0513958 A2 | 11/1992 |
| EP | 1199440 A2 | 4/2002 |
| EP | 1548233 A1 | 6/2005 |
| GB | 2262966 A | 7/1993 |

OTHER PUBLICATIONS

International Search Report for corresponding International Application PCT/SE2008/000229.

(Continued)

*Primary Examiner* — Ninh H Nguyen
(74) *Attorney, Agent, or Firm* — WRB-IP LLP

(57) ABSTRACT

A gas turbine engine component is provided including at least one ring element, and a plurality of circumferentially spaced load carrying vanes extending in a radial direction of the ring element. The load carrying vanes have an internal structure with an anisotropic load carrying property, and the internal structure is configured so that a main load carrying direction is in parallel with the extension direction of the load carrying vane. The component includes a stiffening structure bridging the distance between at least two adjacent load carrying vanes in the circumferential direction of the ring element, and the at least two adjacent load carrying vanes are attached to the stiffening structure.

51 Claims, 12 Drawing Sheets

U.S. PATENT DOCUMENTS

| | | | |
|---|---|---|---|
| 5,259,183 A | 11/1993 | Debeneix | |
| 5,272,869 A | 12/1993 | Dawson et al. | |
| 5,320,490 A | 6/1994 | Corbin et al. | |
| 5,483,792 A * | 1/1996 | Czachor et al. | 60/796 |
| 5,740,674 A | 4/1998 | Beutin et al. | |
| 6,983,608 B2 * | 1/2006 | Allen et al. | 60/798 |

OTHER PUBLICATIONS

International Preliminary Report on Patentability for corresponding International Application PCT/SE2008/000229.

Supplementary European Search Report from corresponding European App. EP 08 72 4149.

* cited by examiner

GAS TURBINE ENGINE COMPONENT, A TURBOJET ENGINE PROVIDED THEREWITH, AND AN AIRCRAFT PROVIDED THEREWITH

BACKGROUND AND SUMMARY

The present invention relates to a gas turbine engine component comprising at least one ring element and a plurality of circumferentially spaced arms extending in a radial direction of the ring element.

The invention also relates to a turbojet engine provided with such a gas turbine engine component, as well as an aircraft provided with such a turbojet engine.

In particular, the invention relates to a component that defines a part of a fan and wherein there are provided aerodynamic guide vanes for the guiding of gases in a by pass channel of the engine and wherein there are also provided structural vanes or load carrying vanes designed to secure the load-carrying ability of the fan assembly, and wherein said arms define either of said types of vanes. However, in a broad sense, the invention relates to all kinds of structures in turbojet engines wherein there is a plurality of arms, typically vanes or load carrying vanes, connected to an outer ring element. For example, such structural vanes may be arranged in an engine core gas channel, but also in a fan section of an engine type where the fan section is arranged in a common gas channel upstream of a division into a core gas channel and a bypass gas channel.

Furthermore, the invention is particularly advantageous, and therefore includes, components of turbojet engines by which the above-mentioned arms and the ring element comprises an anisotropic material such as a composite material, typically a fibre-reinforced polymer.

The invention especially relates to a gas turbine engine component comprising a plurality of circumferentially spaced load carrying vanes extending in a radial direction of the ring element, wherein the load carrying vanes have an internal structure with an anisotropic load carrying property, and wherein the internal structure is configured so that a main load carrying direction is in parallel with the extension direction of the load carrying vane.

The term "ring element", as referred to herein, may comprise only a part, i.e. a sector, of a ring, or a continuous full ring. Further, the ring element may form part of a housing, casing, or other similar component.

Turbojet engines may comprise a fan part that comprises a channel defined by an outer ring element, or outer casing, and an inner ring element, or inner casing. There is also a plurality of guide vanes and structural vanes extending in a radial direction between the outer ring element and the inner ring element. There is also provided an engine mount by means of which the engine is to be suspended in a frame, preferably a wing, of an aircraft. Thereby, the engine mount may be attached to the above-mentioned outer ring element. For the purpose of saving weight some of the above-mentioned components, such as the guide vanes and the outer ring element may be made of a composite material such as a fibre-reinforced polymer.

Typically, a structure like the one mentioned above will be subjected to large mechanical forces in many directions upon operation of the engine. When a material such as a fibre-reinforced polymer is used for some of said components these components will present a high ability of absorbing forces, i.e. a high tensile strength, in the lengthwise direction of the fibres. Typically, the fibres are oriented in a plane. More specifically, there may be four fibre directions in the plane. However, when and where a bending force is to be absorbed by such a component in a joint to another element, the ability of absorbing said force will be heavily reduced due to the incapacity of said material when it comes to the absorption of forces in a direction cross-wise to the fibre plane. Specifically, a joint between a vane with said arrangement of the fibres in a fibre plane and the outer ring element would have a low ability of absorbing a force in a direction cross-wise to the fibre plane. In other words, the bending rigidity of such a material is relatively low. In this respect the material presents a rather remarkable anisotropy.

U.S. Pat. No. 5,320,490 discloses a casing structural arm of a gas turbine engine component, wherein said arm is connected to an outer ring element and an internal inner ring element. The arm, which may be made of a composite material, presents four corners, two of which meet the outer ring element and the other two of which meet the inner ring element. In each corner there is provided a brace, made of metal, which is used for the fixing of the arm in relation to the outer ring element and the inner ring element respectively. The braces make it possible to link the arms directly with the inner ring element and the metallic outer ring element while ensuring the proper transmission of stresses through these arms.

U.S. Pat. No. 5,740,674 discloses an arrangement of aerodynamic and structural vanes of a gas turbine engine component, said vanes extending in a radial direction of the engine and being fixed between an outer ring element and an inner ring element of the casing. The groups of aerodynamic vanes are solidly attached to respective flanges which are screwed onto the outer ring element. Pairs of aerodynamic vanes are connected by one and same, common flange.

It is desirable to present a gas turbine engine component, which is of relatively light weight and provides a sufficient mechanical strength, and which promotes the use of light weight materials, such as composites of fibre-reinforced polymers, that might be of anisotropic character for the design of the vanes and/or a ring element of the engine.

According to an aspect of the present invention, a gas turbine engine component is provided comprising at least one ring element, and a plurality of circumferentially spaced load carrying vanes extending in a radial direction of the ring element, wherein the load carrying vanes have an internal structure with an anisotropic load carrying property, and wherein the internal structure is configured so that a main load carrying direction is in parallel with the extension direction of the load carrying vane, characterized in that the component comprises a stiffening structure bridging the distance between at least two adjacent load carrying vanes in the circumferential direction of the ring element, and that said at least two adjacent load carrying vanes are attached to the stiffening structure.

Preferably, the load carrying vane comprises a composite material. Especially, the composite material comprises a plurality of fibres oriented in a plane, which is in parallel to the extension direction of the load carrying vane and an axial direction of the component. Especially, the fibres extend in at least two directions in said plane, wherein a first direction is in parallel with the extension direction of the load carrying vane and a second direction is in parallel with the axial direction of the component. Thus, the first fibre direction defines the main load carrying direction and the second fibre direction defines a secondary load carrying direction. The first and second fibre directions are preferably perpendicular relative to one another.

The invention creates conditions for a joint between the load carrying vane and the stiffening structure, which is of high strength and high stiffness. More specifically, the joint is adapted so that the forces during operation will be directed in a fibre plane of the composite material of the load carrying vane, wherein the joint will have high strength. Further the joint is adapted to secure the load carrying vane in way that the joint will have a high stiffness.

Further, the invention creates conditions for using a light weight outer ring element, that still will be able to adopt the forces in an axial direction that it will be subjected to during engine operation. Preferably, the ring element comprises a composite material. In other words, the primary loads (radial to circumferential direction) are carried by the joint between the load carrying vane and the stiffening structure, wherein the ring element is substantially free from the primary loads.

Further, the stiffening structure is configured for distributing and/or transferring loads, especially radial to circumferential loads. Especially, the stiffening structure may be configured for transferring loads between the load carrying vanes and an engine mount. The ring element may be configured for connection of the component to adjacent gas turbine components in an axial direction of the gas turbine. The ring element may further be configured for transferring axial loads and/or sealing an interior space. The stiffening structure is preferably connected to the ring element in a way that no substantial loads in the radial direction are transferred between them. In other words, the stiffening structure is preferably connected to the ring element in a way that solely fixes their mutual positions. The stiffening structure is preferably positioned on a radial interior side of the ring element.

According to one embodiment, the stiffening structure is adapted for a higher bending strength than the load carrying vane. By supplementing the load carrying vane with a material of higher bending strength in a transition region at its end(s), the component will get an improved ability to withstand bending forces upon operation of said engine. Preferably, the stiffening structure is formed by a metallic material. According to a preferred embodiment, the stiffening structure comprises a plurality of sets of attachment portions, that the sets are spaced in the extension direction of the stiffening structure such that they match the distance between the load carrying vanes. Further, the gas turbine engine component comprises a plurality of attachment members and that each attachment member is adapted to connect one of said load carrying vanes to the attachment portions of the stiffening structure. The attachment member is adapted to achieve a high stiffness joint between the load carrying vane and the stiffness structure. In this way, the stiffening structure may be formed by a continuous ring and each load carrying vane may be bolted between an attachment member and a web of the stiffening structure.

According to an aspect of the present invention, a gas turbine engine component is provided comprising an outer ring element, a plurality of circumferentially spaced load carrying vanes extending in a radial direction of the ring element, and a load transferring element adapted to transfer loads to and/or from the load carrying vanes characterized in that the component comprises a stiffening structure bridging the distance between at least two adjacent load carrying vanes in the circumferential direction of the ring element, and that said at least two adjacent load carrying vanes are attached to the stiffening structure, that the stiffening structure is positioned on a radial interior side of the ring element and that the load transferring element is directly connected to the stiffening structure. The load transferring element may constitute an engine mount.

By the provision of the stiffening structure, the outer ring element does not need to be configured to carry any substantial radial loads between the load carrying vanes and the load transferring element. Thus, the invention creates conditions for using a light weight outer ring element, that still will be able to adopt the forces in an axial direction that it will be subjected to during engine operation. Preferably, the outer ring element comprises a composite material.

According to an aspect of the present invention, a gas turbine engine component is provided comprising at least one ring element, a plurality of circumferentially spaced arms extending in a radial direction of the ring element, and at least one attachment means adapted to attach at least one of said arms to said ring element, characterized in that the attachment means comprises a material that presents different properties in relation to the arm and/or the ring element, and that the attachment means form a stiffening structure bridging the distance between at least two adjacent arms in the circumferential direction of the ring element.

Preferably, the at least one attachment means is a separate part which is attachable to and removable from the arms to which it is connected. Preferably, it is also attachable to and removable from the ring element. According to one embodiment, the attachment means forms a bracket.

According to one embodiment, the arm and/or the ring element has an internal structure with an anisotropic load carrying property, and that the internal structure is configured so that a main load carrying direction is in parallel with the extension direction of the arm or the ring element, respectively. Preferably, a composite material is used comprising a plurality of fibres oriented in a plane, which is in parallel to a longitudinal direction of the arm and an axial direction of the component. Especially, the fibres extending in a at least two directions in said plane, wherein a first direction is in parallel with the longitudinal direction of the arm and a second direction is in parallel with the axial direction of the component.

Aerodynamic or structural arms or vanes of a light weight material presents a relatively low bending strength, and for that reason is facilitated by a supplement of a material of higher bending strength in a transition region in which it is connected to an outer ring element in order to withstand bending forces upon operation of said engine. Further, the invention creates conditions for a light weight outer ring element, that still will be able to adopt the forces in a circumferential direction that it will be subjected to during engine operation.

According to one embodiment, the attachment means therefore comprises a material of a higher bending strength than the material of the arm and/or the ring element. According to an alternative or complement, a geometry of the attachment means is designed for achieving an enhanced bending strength. Further, a metallic material is especially useful for this purpose since it can easily be formed to a suitable shape with preserved strength.

According to one embodiment, the attachment means comprises a material of a substantially isotropic internal structure.

According to one embodiment, the attachment means comprises a metallic material. Preferably, the metal is of a light weight, high strength and stiffness material such as an aluminum alloy or a titanium alloy.

According to an aspect of the present invention, a gas turbine engine component is provided comprising at least one ring element, a plurality of circumferentially spaced arms extending in a radial direction of the ring element, and at least one attachment means adapted to attach at least one of said arms to said ring element, characterized in that the arm and/or the ring element has a main load carrying direction in parallel with its extension direction and that said attachment means forms a stiffening structure bridging the distance between at least two adjacent arms in the circumferential direction of the ring element.

According to one embodiment, the arm is attached to both an outer ring element.

Accordingly, the ring element according to the invention may be either an outer ring or an inner ring to which the arms are attached. Further, said attachment means may be provided only for attaching the arm at one end to the outer ring element, or at both ends. Thus, different types of attachment means may be used for the inner ring and the outer ring.

According to one embodiment, said stiffening structure extends along an arc of a circle sector of at least 45°, preferably at least 90°, or most preferably at least 180°. According to one embodiment, the circumferential length along which said stiffening structure extends at least over a distance corresponding to a part of the component which is assumed to adopt a major part of the forces between an engine and an engine mount arranged for the purpose of holding or suspending the engine in relation to an aircraft. Said engine mount may be designed so as to be in engagement with the stiffening structure along a part of the arc of a circle sector defined by said casing or outer ring element. Said stiffening structure formed by said at least one attachment means should, preferably, extend along at least said part engaged with the engine mount, or even beyond that part in the circumferential direction. The engine mount may be connected directly the stiffening structure. Said stiffening structure will promote the use of a light weight material of the ring element to which it is connected, since it will supplement the load-carrying capacity thereof.

According to one embodiment, said stiffening structure extends continuously along the whole length of the arc of a circle. Thereby, said structure defines an annular element, contributing fully to the strength of the ring element to which it is connected. Accordingly, the use of a light weight, possibly anisotropic material as the ring element is promoted, since a substantial addition to the load-carrying capacity thereof is provided for by said structure formed by the arms and attachment means.

According to one embodiment, said ring element is an outer ring element, and said at least one attachment means is attached to and connects said plurality of arms to said ring element, wherein said gas turbine component comprises an engine mount provided on the outside of the outer ring element, the engine mount being attached to said at least one attachment means.

According to one embodiment, the outer ring element presents at least one radial opening through which the engine mount extends.

According to one embodiment, the gas turbine component comprises a plurality of said attachment means, each of which extends between and is attached to one of two adjacent arms of said plurality of arms.

According to one embodiment, the gas turbine component comprises a plurality of said attachment means, each of which extends between and is attached to two adjacent arms of said plurality of arms.

According to one embodiment, the at least one attachment means is attached by means of bolts to said ring element.

According to one embodiment, the at least one attachment means is attached by means bolts to said plurality of arms.

According to one embodiment, the plurality of arms constitute vanes of a fan of a turbojet engine.

According to one embodiment, said plurality of arms comprises force-absorbing structural vanes (load carrying vanes). According to a further development of the last-mentioned embodiment, at least one of the plurality of load carrying vanes attached to the stiffening structure has an aerodynamic shape and thereby forms an aerodynamic guide vane.

One advantage with the abovementioned component design with an attachment means (bracket) that is a separate piece and is possible to disassemble from the arm is that such a configuration creates conditions for disassembly for maintenance and repair.

Further features and advantages of the present invention will be presented in the following detailed description of a preferred embodiment.

BRIEF DESCRIPTION OF THE DRAWINGS

A preferred embodiment of the invention will now be described more in detail, by way of example, with reference to the annexed drawing, on which.

DETAILED DESCRIPTION

Figure 1:
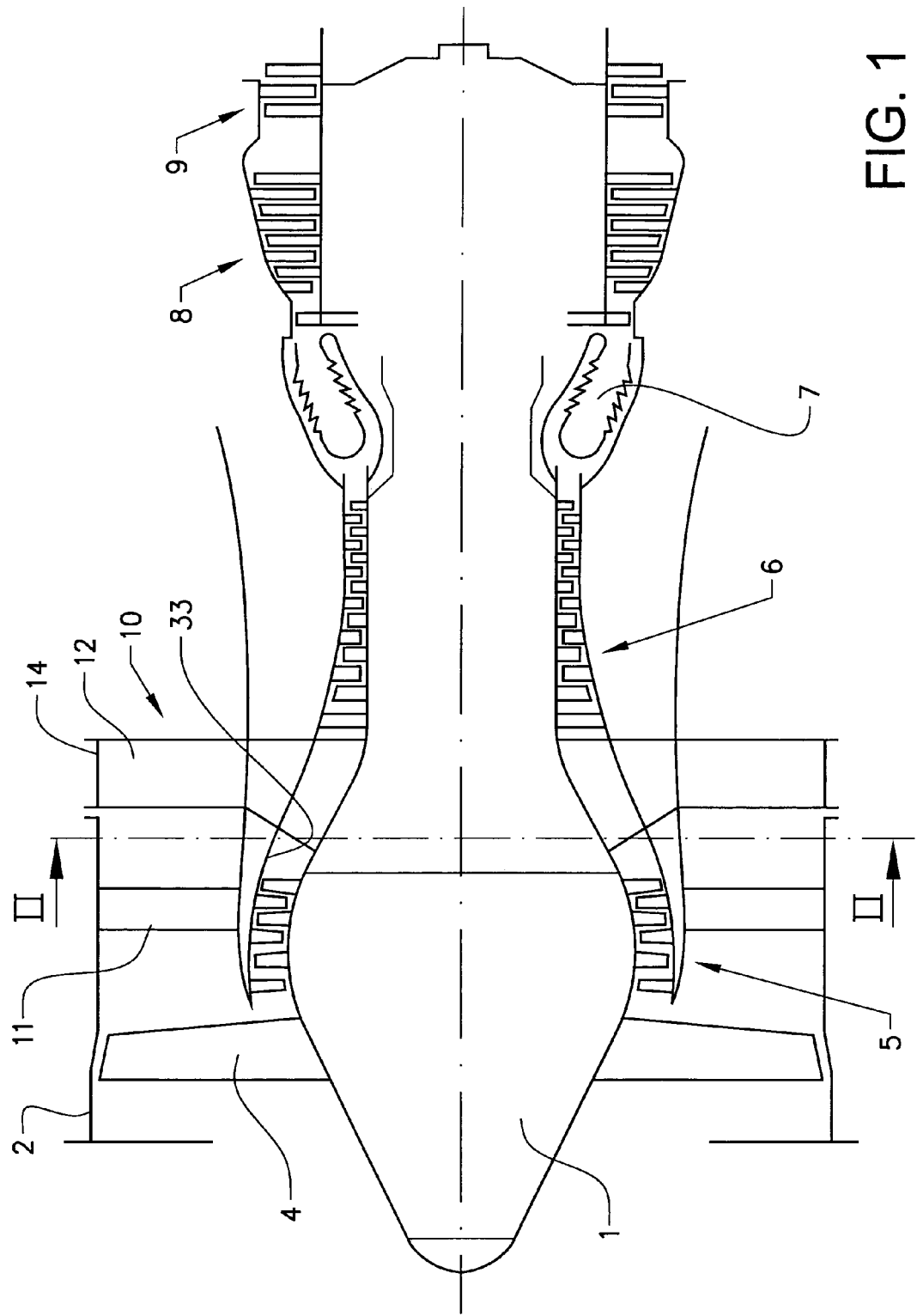
FIG. 1 is a schematic side view of a turbojet engine according to the invention.

FIG. 1 shows a turbojet engine. The turbojet engine comprises a central body 1, an annular outer casing 2 (fan casing), an annular inner casing 33 (engine casing), a fan or blower 4, a low pressure compressor 5, a high pressure compressor 6, a combustion chamber 7, a high pressure turbine 8 and a low pressure turbine 9. It further comprises a set of arms 10 extending in a radial direction from the inner casing 33 to the outer casing 2. The arms 10 comprise aerodynamic vanes 11 primarily provided to act as guide vanes for air passing through the annular channel between the inner casing 33 and the outer casing 2 in an axial direction, i.e. a longitudinal direction, of the engine. The arms 10 further comprise structural arms or load carrying vanes 12 primarily provided to guarantee a certain mechanical strength of the construction. Here, the aerodynamic vanes 11 and the load carrying vanes 12 are arranged in axially separated sets of arms. However, they could as well be arranged in an interleaving relation in one and the same set of arms.

The flow through the turbojet engine is divided into two major streams, a first one of which passes through an annular channel between the central body 1 and the inner casing 33, and passes the compressors 5, 6, the combustion chamber 7 and the turbines 8, 9. A second stream passes through the annular channel between the inner casing 33 and the outer casing 2. A temperature of the second stream is in operation lower than a temperature of the first stream, but the second stream substantially increases the thrust of the turbojet engine. There is also provided an engine mount 13 (see FIG. 2) by means of which the turbojet engine is attached to and held in position in relation to an aircraft.

Figure 2:
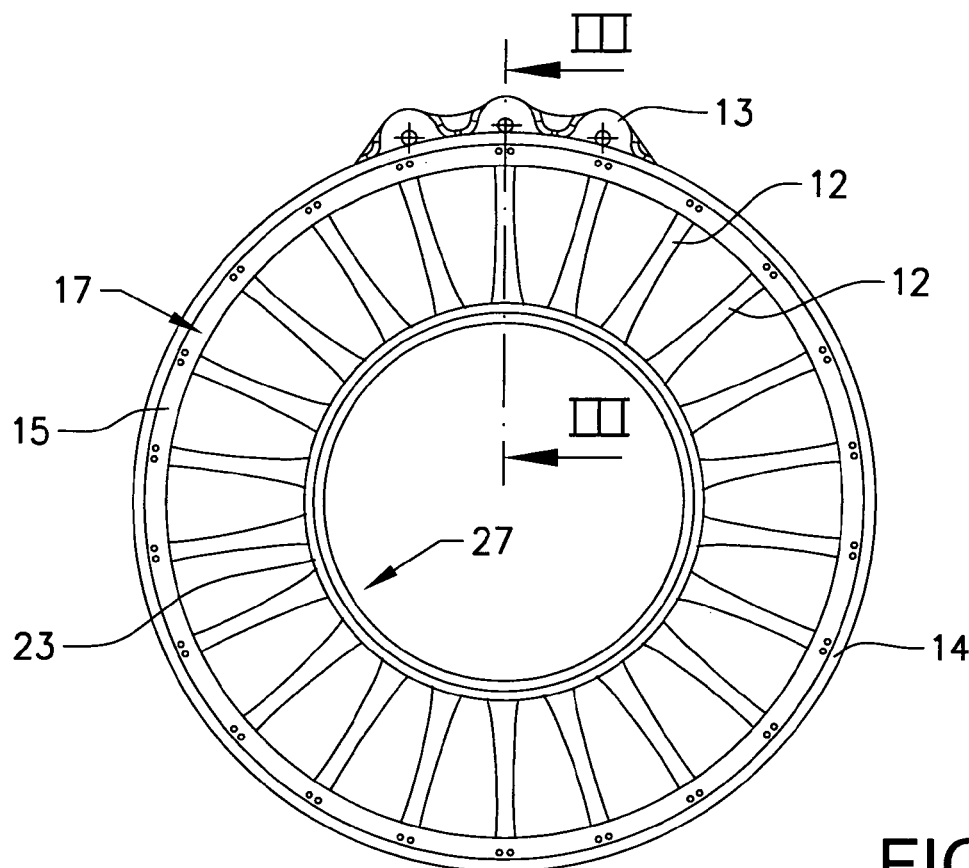
FIG. 2 is a side view of a gas turbine engine component according to a first embodiment according to II-II in FIG. 1.

With reference now to FIG. 2 to FIG. 6, a first embodiment of a gas turbine engine component shall now be discussed more in detail. The component comprises an outer ring element 14, which forms part of the outer casing 2 and a plurality of circumferentially spaced load carrying vanes 12 extending in a radial direction of the outer ring element and between the outer ring element and the inner casing 33. FIG. 2 further shows an engine mount 13. The outer ring element 14 comprises a wall in the form of a sheet with main surfaces facing in a radial direction.

At least some of the load carrying vanes 12, preferably a major part thereof, have an internal structure with an anisotropic load carrying property, and wherein the internal structure is configured so that a main load carrying direction is in parallel with, or at least close to parallel with, the extension direction of the load carrying vane 12. The extension direction of the load carrying vane 12 coincides with a radial direction of the component. However, according to an alternative, the load carrying vane may be arranged with an inclination (preferably <30°) in relation to the radial direction of the component. The load carrying vane 12 preferably comprises a composite material comprising a plurality of fibres extending in a plane in parallel with the extension direction of the load carrying vane 12 for establishing the main load carrying direction in parallel with the extension direction of the load carrying vane 12.

Especially, at least some of the load carrying vanes 12, preferably a major part thereof, are made of a fibre-reinforced light weight polymer material, with a density below that of, for example, light weight metals such as aluminum and titanium. Preferably, the fibres extend in a plane mainly in parallel with the longitudinal direction of the load carrying vanes 12, thereby contributing to a high tensile strength of the load carrying vanes 12 in the radial direction. A preferred fibre material of the fibre-reinforced composite is carbon fibre. The load carrying vanes 12 may further have an aerodynamically adapted cross-section, with a leading upstream edge and a trailing downstream edge as seen in the axial direction, i.e. the flow direction through the channel between the outer ring element 14 and the inner casing 33.

Figure 5:
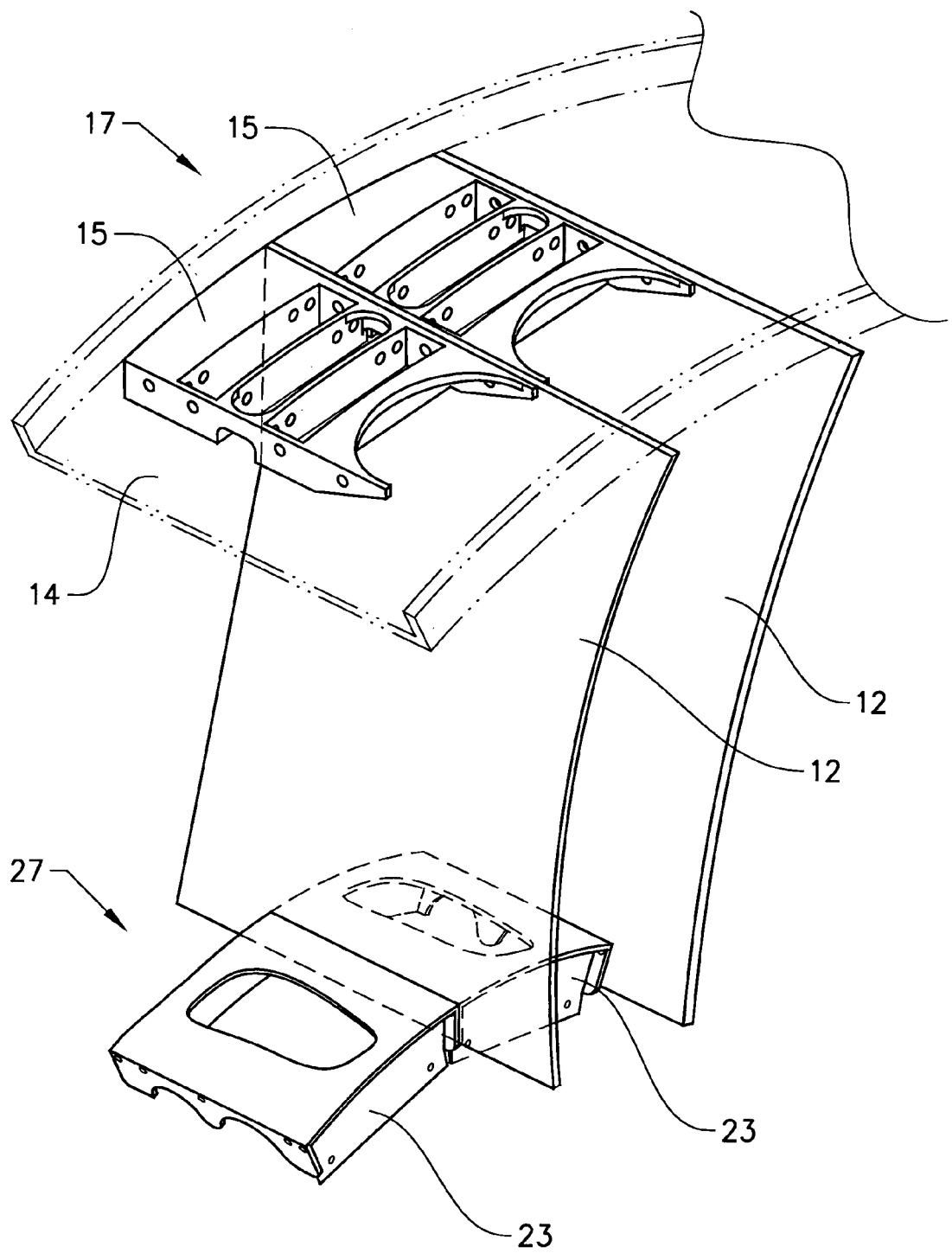
FIG. 5 is a representation of an inner stiffening structure and an outer stiffening structure formed by the brackets in FIG. 4a-4d.

An outer stiffening structure 17 is adapted to bridge the distance between at least two adjacent load carrying vanes 12 in the circumferential direction of the ring element 14, see FIG. 5. The stiffening structure 17 defines a structural member to which the load carrying vanes 12 are attached. More specifically, the stiffening structure 17 forms a framework adapted for attachment of said load carrying vanes 12. The stiffening structure 17 is adapted to form a rigid support for the load carrying vane end. The stiffening structure 17 is further adapted to transfer loads in the longitudinal direction of the load carrying vanes 12 to a circumferential direction in the stiffening structure. The stiffening structure 17 is positioned on a radial interior side of the outer ring element 14 and is connected to the outer ring element 14.

The stiffening structure 17 preferably has an internal structure with an isotropic load carrying property. More specifically, the stiffening structure 17 is adapted for a higher bending strength than the load carrying vane 12. The stiffening structure 17 is preferably formed by a metallic material.

The ring element 14 has an internal structure with an anisotropic load carrying property, and wherein the internal structure is configured so that a main load carrying direction is in parallel with the axial direction of the ring element. The ring element 14 preferably comprises a composite material comprising a plurality of fibres extending in a plane in parallel with the extension direction of the ring element 14 for establishing the main load carrying direction in parallel with the extension direction of the ring element 14.

In a preferred embodiment, the outer ring element 14 comprises a light weight material such as a fibre-reinforced composite, preferably a fibre-reinforced polymer, the fibre preferably being carbon fibre and preferably extending in the circumferential direction of the outer ring element, thereby contributing to a high tensile strength in the axial direction thereof. The outer ring element 14 may, as in the shown embodiment, be of annular shape and may have a length in the longitudinal, i.e. axial direction of the engine corresponding to the extension of each of the arms 12 in said axial direction.

The connection between the stiffening structure 17 and the ring element 14 does not necessarily need to be a rigid connection for transmission of loads. More specifically, according to the first embodiment, the stiffening structure 17 is connected to the ring element 14 via position fixing means 28, which is adapted to only fix their mutual positions. Said position fixing means 28 may be constituted by circumferentially (and axially) spaced small bolts. The ring element 14 may further be configured for transferring axial loads between upstream and downstream gas turbine components.

Figure 4A:
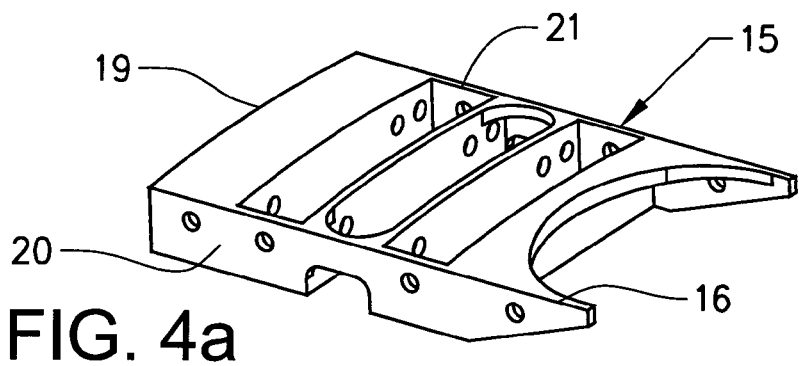
FIGS. 4c and 4d show an inner bracket from two different perspective views.
Figure 4B:
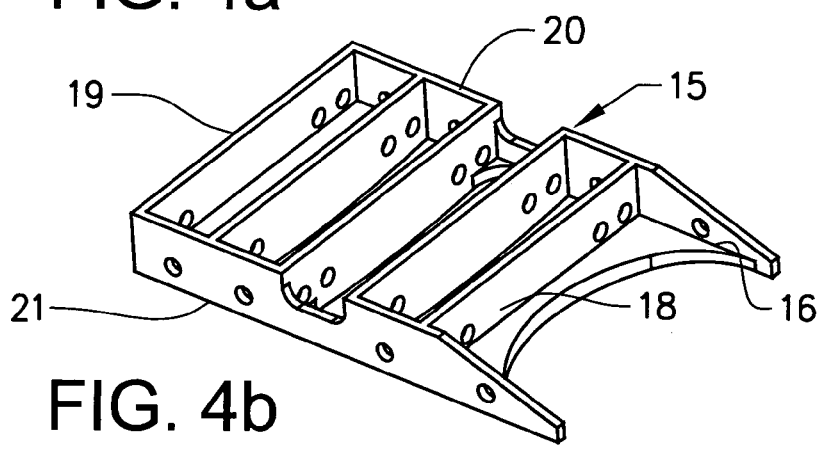
Figure 4C:
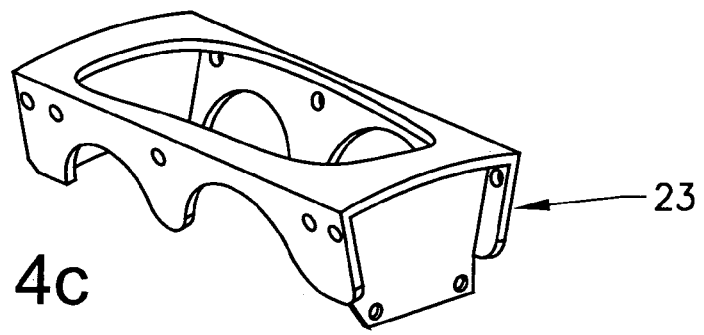
Figure 4D:
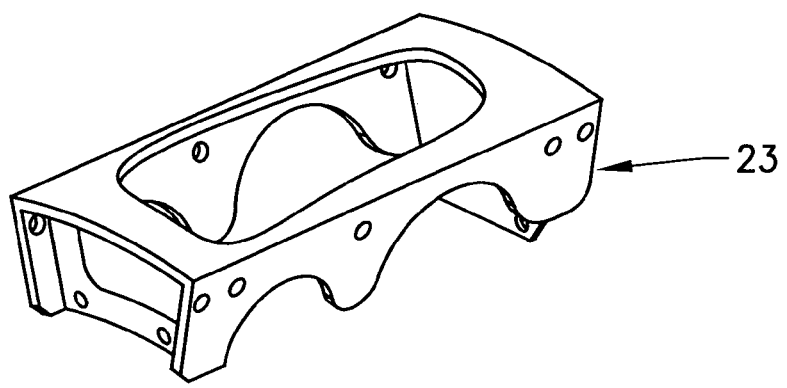

Turning now to FIGS. 4*a*, 4*b* and 5, the stiffening structure 17 comprises a plurality of sets of attachment portions 20,21, wherein the sets are spaced in the extension direction of the stiffening structure such that they match the distance between the load carrying vanes 12. Each set of attachment portions comprises a first portion 20,21 extending in a radial direction of the stiffening structure and is adapted for attachment of one of said load carrying vanes 12. More specifically, the stiffening structure 17 comprises a plurality of interconnected attachment means 15 in the form of brackets, and each individual attachment means 15 comprises one of said sets of attachment portions. For ease of presentation, the attachment means 15 will in the following be referred to as brackets. Each of said brackets 15 extends between and is attached to two adjacent load carrying vanes 12, see FIG. 5. The brackets 15 are adapted to attach the outer ends of the load carrying vanes 12 to the stiffening structure 17. More specifically, each bracket 15 comprises two first portions 20,21, in the form of walls, which are spaced in the circumferential direction of the stiffening structure.

Each bracket 15 extends along the arc of a circle between the outer ends of two adjacent load carrying vanes 12 and is connected to the respective load carrying vane 12, preferably by means of bolting, though other fastening principles might be conceived. Each bracket 15 also extends close to, preferably in supporting contact with, the inner periphery of the outer ring element 14. Each bracket 15 presents said attachment portions 20,21 at its opposite ends in the circumferential direction for the purpose of interconnecting the brackets to form said continuous ring-shaped stiffening structure 17.

In the preferred embodiments shown in FIGS. 4a and 4b, said attachment portions 20,21 comprises flanges at the ends of the bracket 15 as seen in the circumferential direction of the component. Accordingly, through engagement between said attachment portions 20,21 of adjacent attachment means, for example by means of bolts or the like, the mechanically interconnected stiffening structure 17 is formed by a plurality of interconnected brackets. The end parts of the load carrying vanes 12 to which the bracket 15 is connected may be regarded as part of said structure 17, since they will contribute to the strength thereof in said axial direction as well as the circumferential direction. Each bracket has a box shape, comprising pairs of opposite walls 18, 19 and 20, 21, two of which 20,21 are to be attached to adjacent load carrying vanes 12. Each bracket 15 extends a substantial part of the distance from a leading edge of the load carrying vanes 12 to the trailing edge of the load carrying vanes 12, thereby forming a stable support for the load carrying vanes 12.

Each bracket 15 is made of a material that, at least in the corner which corresponds to the corner in which the load carrying vane 12 attached thereto meets the outer ring element 14, has a higher bending rigidity than the material of the load carrying vane 12 in question. Preferably, the bracket 15 is made of a metal or metal alloy such as a titanium alloy, at least in said corner region and preferably all over. Such a material will have a remarkably higher degree of isotropy than the above-mentioned fibre-reinforced composites and will add to the bending strength of the transition region between the load carrying vanes 12 and the outer ring element 14. Further, the brackets 15 have a geometry that enhances the stiffness of the structure 17. Since the load carrying vanes 12 will form part of the continuous ring-shaped stiffening structure 17, they will also add to the strength of the structure in the circumferential and axial directions thereof.

In a similar manner as for the outer stiffening structure 17, an inner stiffening structure 27 is adapted to bridge the distance between at least two adjacent load carrying vanes 12 in the circumferential direction of the ring element 14, see FIG. 5. There are also provided brackets 23 for the purpose of connecting the opposite, inner ends of the load carrying vanes 12 to the inner casing 33. These inner brackets 23 are shown in detail in FIGS. 4c and 4d. Although FIG. 5 only shows a section of the component, the stiffening structures preferably extend continuously in the circumferential direction. The individual design of the brackets 23 as well as the interconnection thereof and their connection to the inner casing 33 generally corresponds to those of the first-mentioned brackets 15 with regard to the outer stiffening structure 17. However, the invention also includes embodiments in which there are substantial differences as to the design of the brackets 23 connected to the inner casing 33 with regard to those connected to the outer ring element 14, as well as embodiments where the interconnection thereof is different, or even non-existent, and where the connection thereof to the inner casing 33 differs from that of the brackets 15 to the outer ring element 14.

According to an alternative, the brackets 23 are integrated in the inner casing 33.

Figure 3:
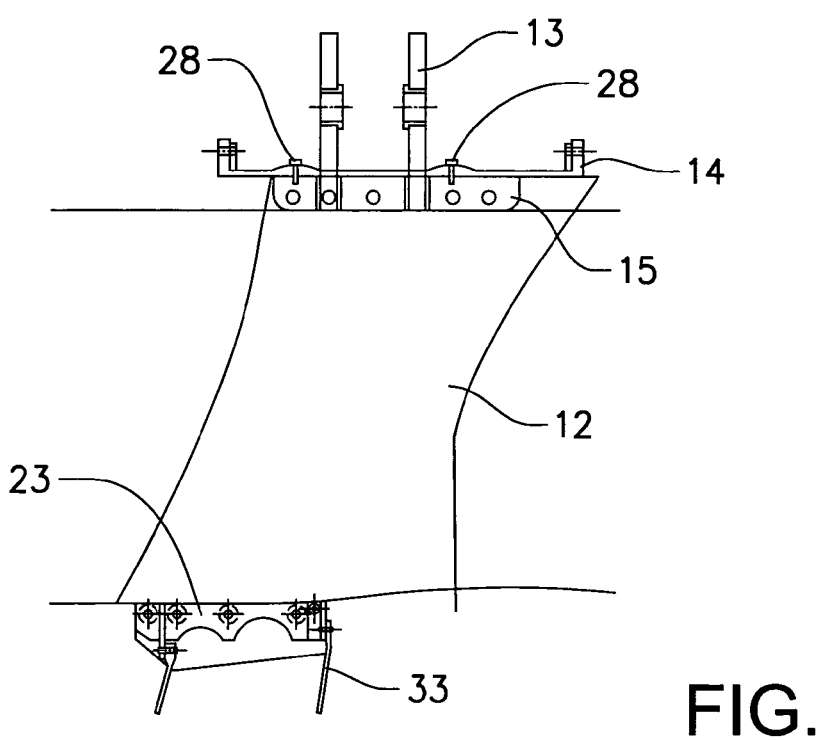
FIG. 3 is a cross-section according to HI-IH in FIG. 2, FIGS. 4a and 4b show an outer bracket from two different perspective views.
Figure 6:
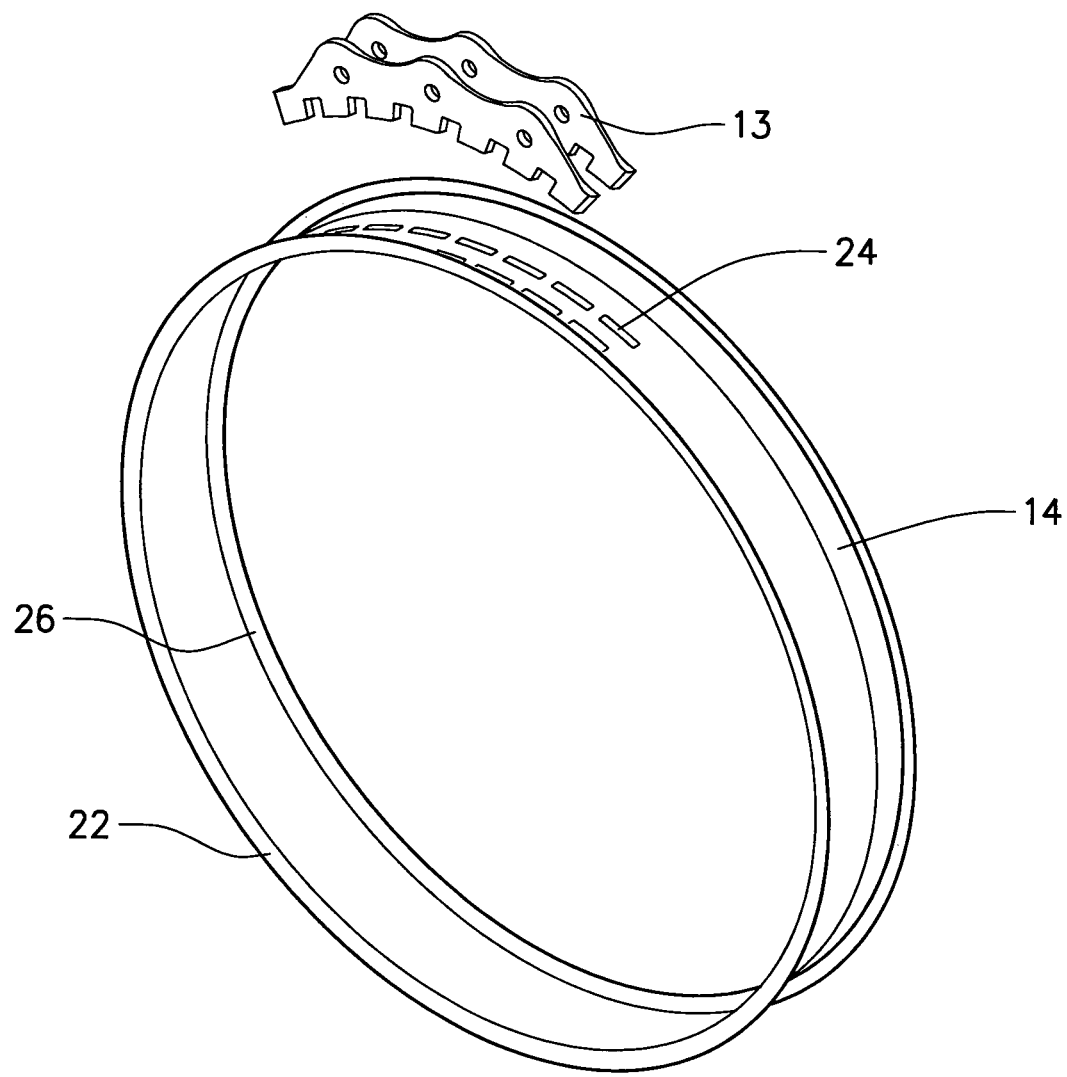
FIG. 6 is an exploded view showing an engine mount and an outer ring element provided with openings for the insertion of the engine mount therein.
Figure 7:
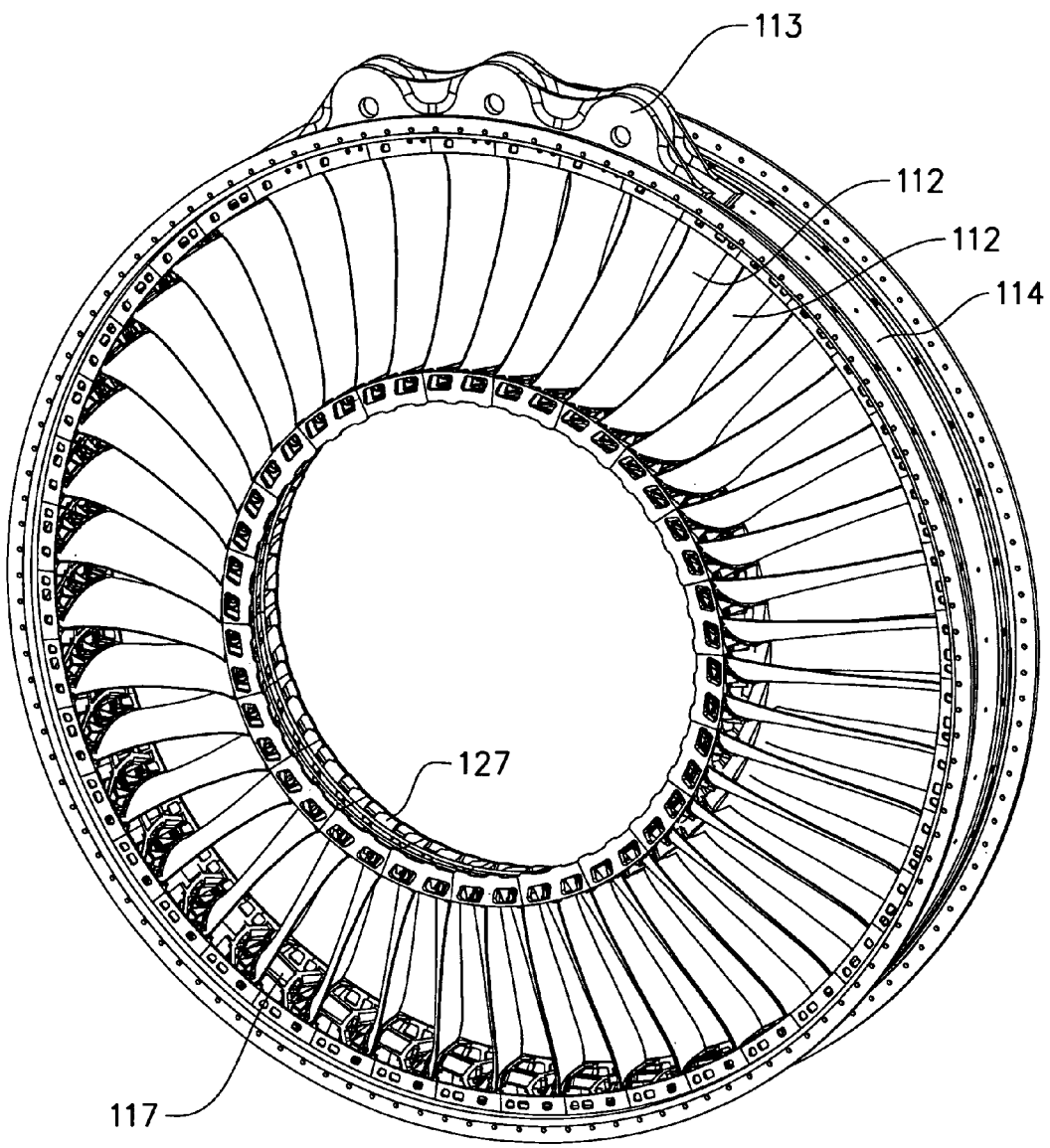
FIG. 7 shows a gas turbine engine component according to a second embodiment in a perspective view.

With reference to FIGS. 2, 3 and FIG. 6 the interconnection between the engine mount 13 and the stiffening structure 17, or more precisely to the brackets 15, will now be described. As can be seen in FIG. 6 the outer ring element 14 is provided with a plurality of circumferentially spaced radial openings 24 corresponding in length and width to the length and width of a plurality of circumferentially spaced projections 25 of the engine mount. More specifically, the radial openings are arranged in two parallel rows extending in the circumferential direction. However, according to an alternative design, the radial openings may be arranged in a single row. Further, the projections form teeth 25 of a comb-shaped engine mount 13. The engine mount 13 is, on one hand, to be connected to a carrying structure of an aircraft (not shown) and, on the other hand, to a structural member of the turbojet engine, such as the outer ring element 14 or, as suggested herein, directly to the brackets 15 by means of which the load carrying vanes 12 are connected to the outer ring element 14. In the embodiment shown, the teeth 25 of the engine mount 13 penetrate the radial openings 24 of the outer ring element 14 and engage the brackets 15 located at the inner periphery of the outer ring element 14. Preferably, bolt joints are used for said engagement. The engine mount 13 may comprise a fibre-reinforced composite material such as a carbon fibre-reinforced polymer. Alternatively it may comprise a metal such a titanium alloy or an aluminum alloy or steel. Thanks to this connection of the engine mount is connected directly to the stiffening structure 17, the outer ring element 14 does not need to transfer any load from the engine mount 13 and need not, accordingly, any particular bending rigidity. It will only need to transmit loads in the axial direction to the load carrying vanes 12 and adopt a radial load that is applied to its opposite radial flanges 22, 26. Accordingly, the inventive design promotes the use of a light weight anisotropic material such as a fibre-reinforced composite material as the structural material of the outer ring element 14. The above described connection of the engine mount 13 to the stiffening structure 17 may be used for connection of any other load transferring element.

With reference now to FIG. 7 to FIG. 16, a second embodiment of a gas turbine engine component shall now be discussed more in detail. In similarity to the first embodiment, the component comprises an outer ring element 114 and a plurality of circumferentially spaced load carrying vanes 112 extending in a radial direction of the component. The load carrying vanes 112 are of similar design as the load carrying vanes 12 described above. Likewise, the outer ring element 114 is of similar design as the outer ring 14 described above and shown in FIG. 6. The component further comprises an outer and an inner stiffening structure 117,127 bridging the distance between at least two adjacent load carrying vanes 112 in the circumferential direction of the ring element 114, and said at least two adjacent load carrying vanes 112 are attached to each of the stiffening structures 117, 127.

The second embodiment of the component differs from the first embodiment in the design of the stiffening structure 117,127. Therefore, the following description of the second embodiment will focus on the design of the respective stiffening structure 117,127.

Figure 8:
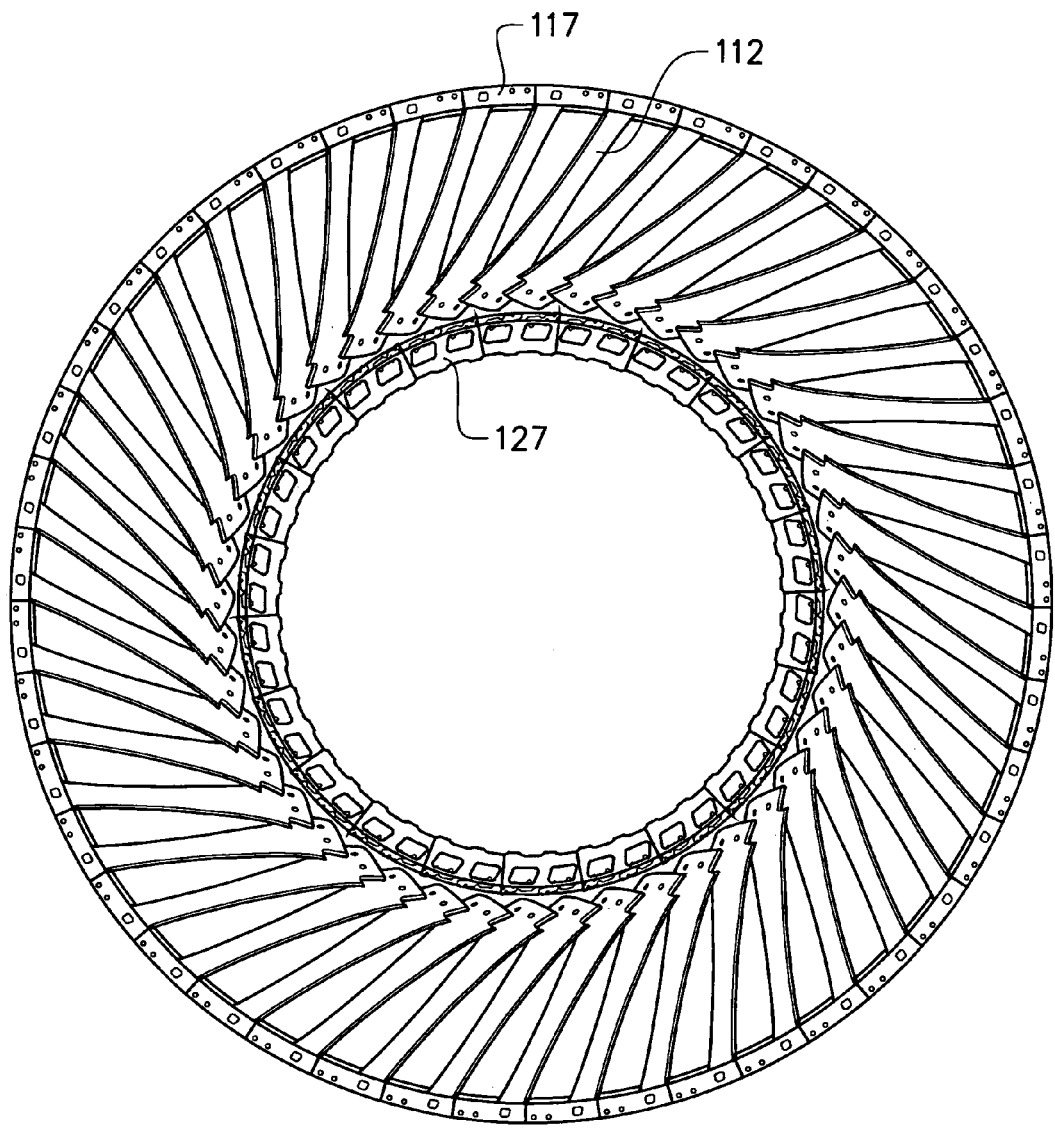
FIG. 8 shows parts of the gas turbine engine component according to the second embodiment in an intermediate assembly stage.

In FIG. 8, the outer stiffening structure 117 and the inner stiffening structure 127 are shown in a view from an axial perspective. Each of the outer stiffening structure 117 and the inner stiffening structure 127 extends continuously along the whole length of the arc of a circle. In contradistinction to the first embodiment, each of the outer stiffening structure 117 and the inner stiffening structure 127 is formed in a one-piece unit.

FIG. 8 shows the component in an intermediate assembly stage. Each of the load carrying vanes 112 is pivotally connected at an outer end to the outer stiffening structure 117. Further, the load carrying vanes 112 are arranged with an inclination relative to their final extension direction (in the radial direction of the component). After positioning of the inner stiffening structure 127 in its intended position radially inside of the outer stiffening structure, the load carrying vanes are pivoted so that the inner ends of the load carrying vanes 112 engage the inner stiffening structure. Thereafter, the load carrying vanes are rigidly attached to the outer stiffening structure 117 and the inner stiffening structure 127, respectively.

Figure 9:
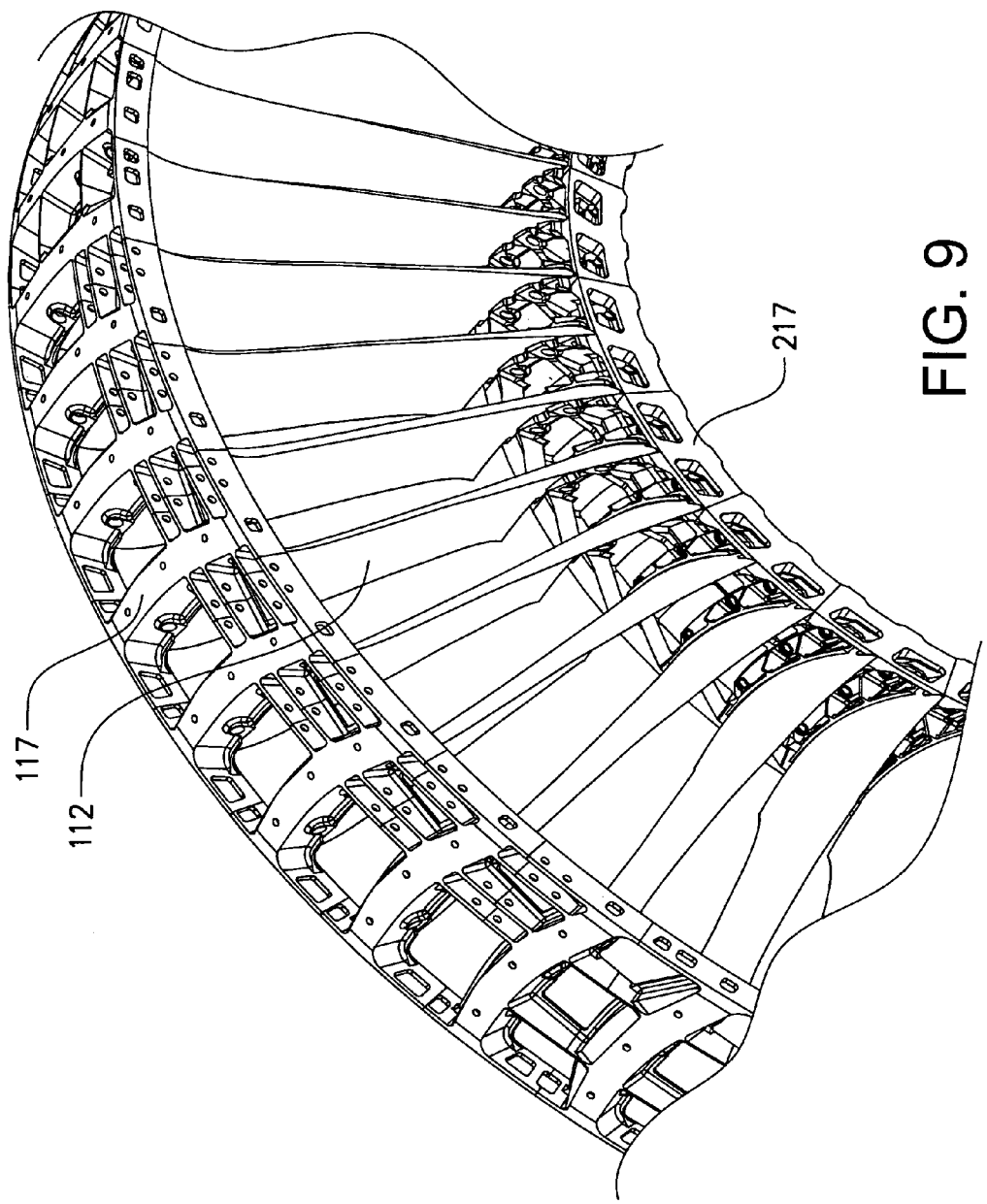
FIG. 9 shows an enlarged view of a segment of the gas turbine engine component according to the second embodiment.
Figure 10:
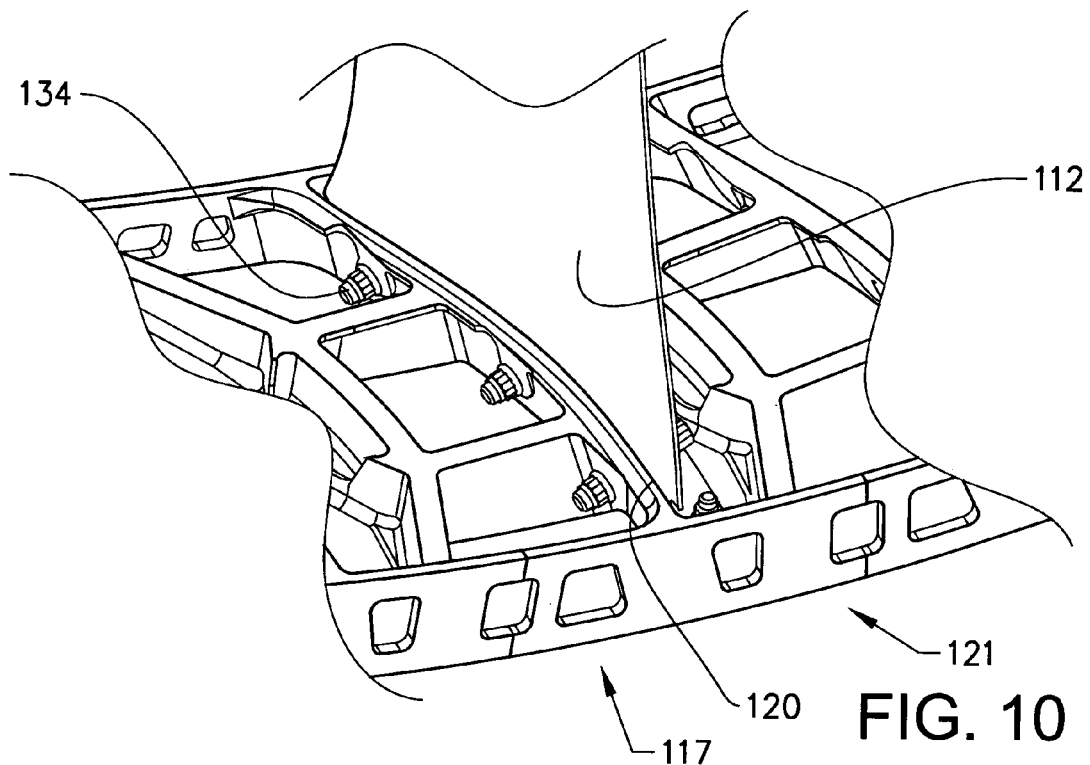
FIG. 10-11 show attachment of a load carrying vane to the outer stiffening structure of the second gas turbine component embodiment in two different perspective views.
Figure 11:
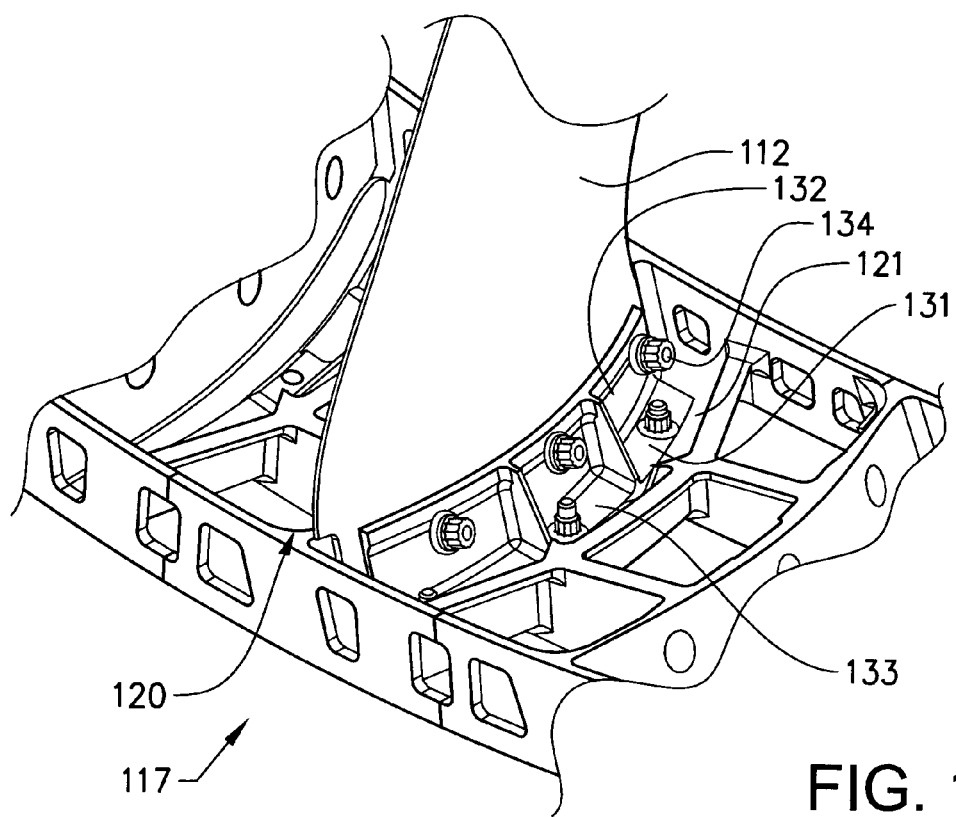

FIG. 9 shows the design of the outer stiffening structure 117 in more detail in a perspective view. The outer stiffening structure 117 forms a framework adapted for attachment of said load carrying vanes 112. More specifically, the stiffening structure 117 comprises a wall structure with a plurality of sets of attachment portions 120, 121 (see FIG. 10 and FIG. 11), wherein the sets are spaced in the circumferential direction of the stiffening structure such that they match the distance between the load carrying vanes 112. Each set of attachment portions comprises a first wall portion 120 extending in a radial direction of the stiffening structure and a second wall portion 121 extending in the extension direction of the stiffening structure. The first wall portion 120 is configured for being positioned in a parallel, overlapping relationship with the outer end of the load carrying vane 112 and configured for a rigid attachment of the load carrying vane 112.

The component comprises a plurality of attachment members 131. Each attachment member 131 is adapted to connect one of said load carrying vanes 112 to the attachment portions of the stiffening structure 117. The attachment member 131 comprises two plate portions, which in cross section extend substantially at right angles to each other. The attachment member 131 forms a one-piece unit in the form of a bracket. In other words, the attachment member 131 has a cross sectional form of an L. A first plate portion 132 is configured to be positioned in parallel to and along the first wall portion 120 so that the load carrying vane end will be positioned between them. The load carrying vane 112 can now be secured to the stiffening structure by means of the attachment member 131. A plurality of axially spaced bolts 134 are arranged to attach the load carrying vane between the first plate portion 132 and the first wall portion 120.

A second plate portion 133 of the attachment member 131 is positioned in a parallel relationship with the second wall portion 121 and secured to the second wall portion 121 via a plurality of axially spaced bolts 134.

Figure 12:
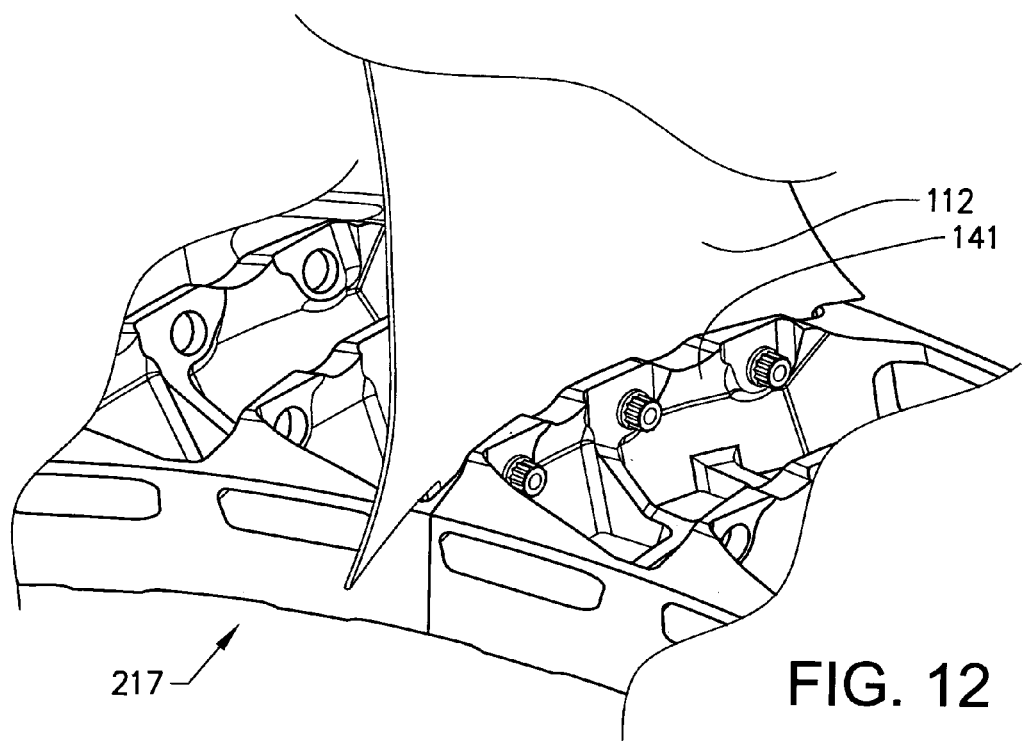
FIG. 12-13 show attachment of a load carrying vane to the inner stiffening structure of the second gas turbine component embodiment in two different perspective views.
Figure 13:
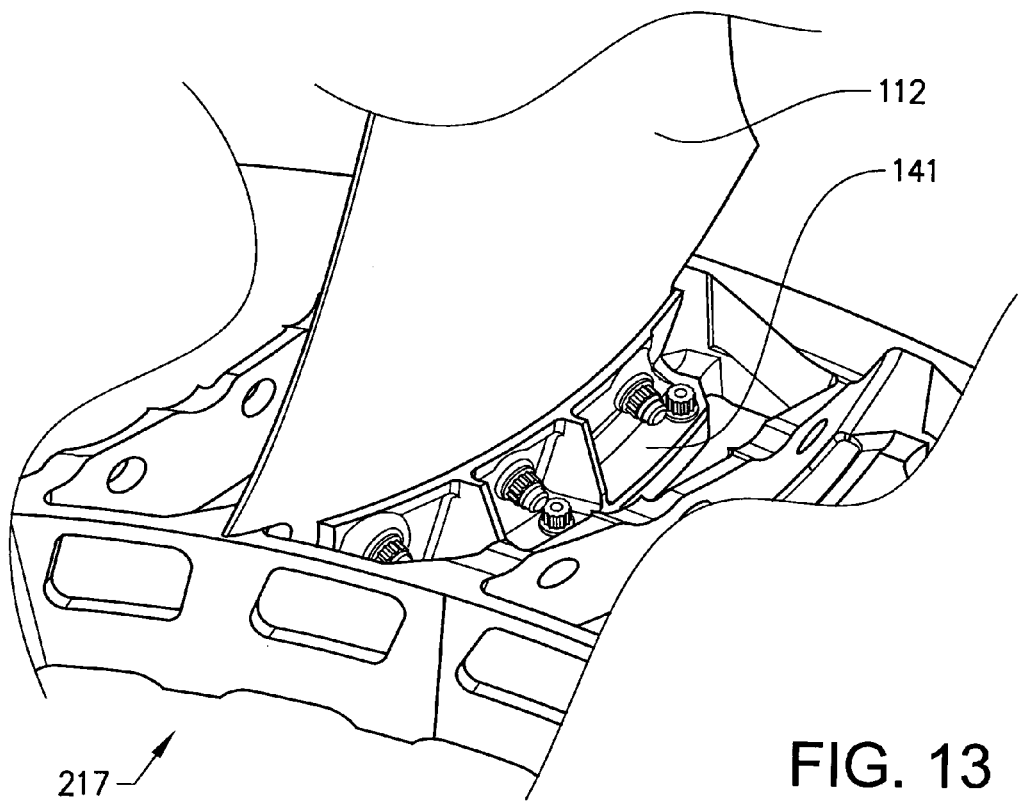

FIGS. 12-13 show the attachment of the load carrying vane to the inner stiffening structure 217. This attachment is accomplished by means of a similarly shaped attachment member 141 in a similar manner as has been described above for the outer stiffening structure 117 and will not be further described here.

Figure 14:
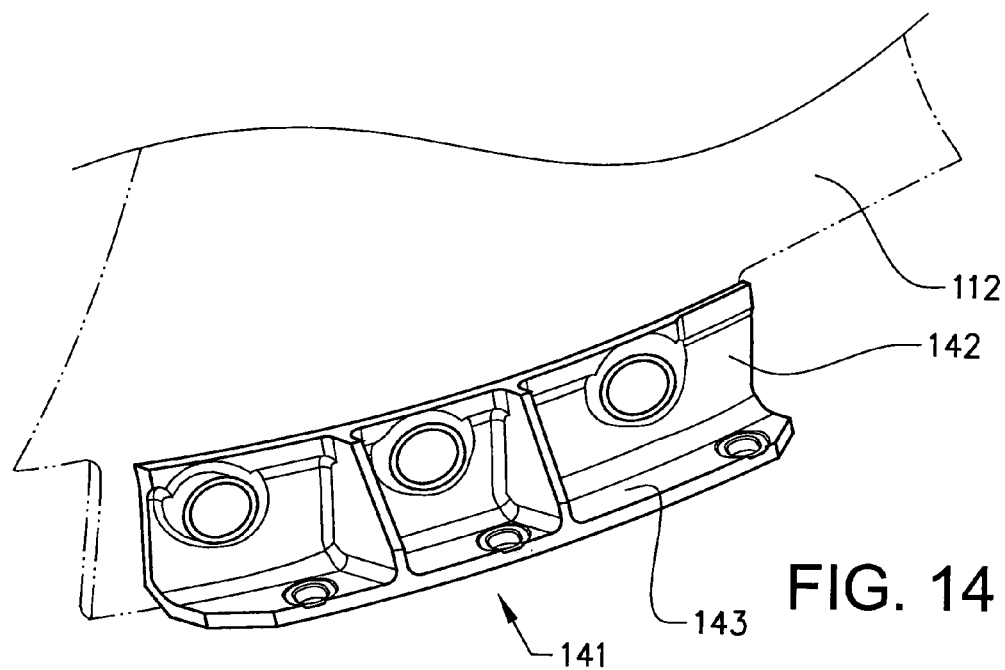
FIG. 14 shows an attachment member in the second gas turbine component embodiment uncovered in a perspective view.
Figure 15:
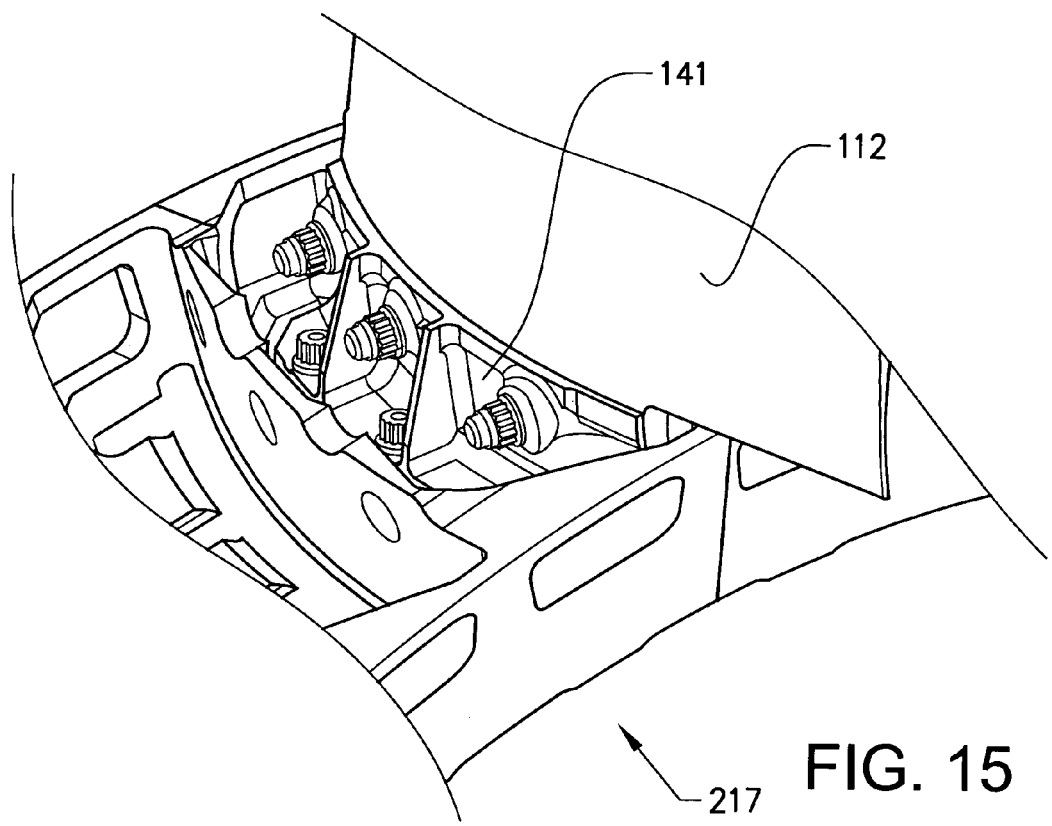
FIG. 15 shows the attachment member of FIG. 15 applied to the stiffening structure.

FIG. 14 shows the attachment member 141 uncovered in a perspective view. The attachment member 141 comprises two plate portions, which in cross section extend substantially at right angles to each other. The attachment member 141 forms a one-piece unit in the form of a bracket. In other words, the attachment member 141 has a cross sectional form of an L. A first plate portion 142 is configured to be positioned in parallel to and along the load carrying vane end and a second plate portion 143 is configured to be positioned in contact with the stiffening structure for attachment thereto. FIG. 15 shows the attachment member 141 applied to the stiffening structure 217.

Figure 16:
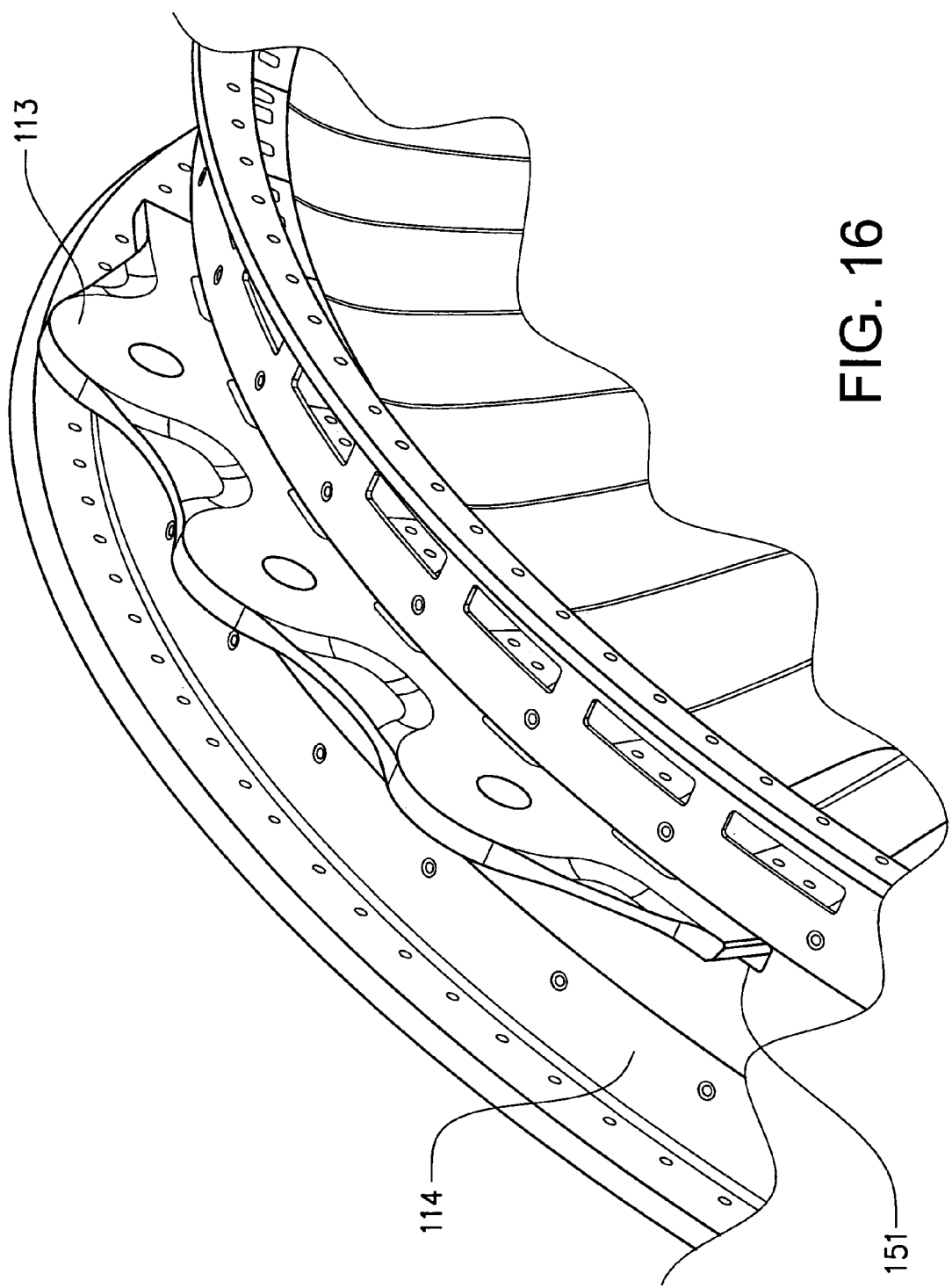
FIG. 16 shows an arrangement of an engine mount in the second gas turbine component embodiment.

FIG. 16 shows an arrangement of an engine mount 113. The engine mount 113 is directly attached to the stiffening structure 117. The engine mount 113 is preferably of similar design as the engine mount 13 described above and shown in FIG. 6. The stiffening structure 117 forms a framework adapted for attachment of the engine mount 113. Further, the outer ring element 141 presents at least one radial opening 151 through which the engine mount 113 extends.

It should be understood that the embodiment of the invention described is only an example of the invention and that alternative solutions within the scope of the invention as limited by the patent claims will be obvious for a person skilled in the art. Accordingly, the scope of protection is defined by the annexed patent claims, supported by the description and the annexed drawing. For example, it should be understood that the fibre plane of the composite material of the load carrying vane can be somewhat curved along the vane profile.

According to an alternative embodiment, the attachment means forms an integral part of the ring element. In other words, the stiffening structure forms the ring element itself. The term "attachment means" may in this embodiment be limited to a part of a bracket which is adapted for connection to the load carrying vane (for example via bolts), while another part of the same bracket is adapted to form the ring element. Further, the ring element is not necessarily formed by joining a plurality of individual brackets, but can instead be formed by a single ring member, which is preferably continuous in the circumferential direction. Thus, the stiffening structure built up by the attachment means is not necessarily arranged as a parallel structure in addition to the ring element.

The invention claimed is:

1. A gas turbine engine component comprising
at least one ring element,
a plurality of circumferentially spaced load carrying vanes extending in a radial direction of the ring element, wherein the load carrying vanes have an internal structure with an anisotropic load carrying property, and wherein the internal structure is configured so that a main load carrying direction is in parallel with an extension direction of a load carrying vane of the load carrying vanes, and
a stiffening structure having an internal structure with an isotropic load carrying property and comprising a plurality of interconnected brackets, each bracket bridging a distance between at least two adjacent ones of the load carrying vanes in a circumferential direction of the ring element, and the at least two adjacent load carrying vanes being attached to attachment portions of the bracket by bolts, the attachment portions being spaced in the circumferential direction and each attachment portion extending in the radial direction.

2. A gas turbine engine component according to claim 1, wherein the load carrying vane comprises a composite material.

3. A gas turbine engine component according to claim 2, wherein the composite material comprises a plurality of fibres extending in a plane in parallel with the extension direction of the load carrying vane.

4. A gas turbine engine component according to claim 1, wherein stiffening structure is adapted for a higher bending strength than the load carrying vane.

5. A gas turbine engine component according to claim 1, wherein stiffening structure is formed by a metallic material.

6. A gas turbine engine component according to claim 1, wherein the stiffening structure is positioned on a radial interior side of the ring element.

7. A gas turbine engine component according to claim 6, wherein the ring element has an internal structure with an anisotropic load carrying property, and wherein the internal structure is configured so that a main load carrying direction is in parallel with the circumferential direction of the ring element.

8. A gas turbine engine component according to claim 7, wherein the ring element comprises a composite material.

9. A gas turbine engine component according to claim 8, wherein the composite material comprises a plurality of fibres extending in a plane in parallel with the extension direction of the ring element.

10. A gas turbine engine component according to claim 1, wherein the ring element forms an integral part of the stiffening structure.

11. A gas turbine engine component according to claim 1, wherein the ring element comprises a wall with main surfaces facing in a radial direction.

12. A gas turbine engine component according to claim 1, wherein the stiffening structure" forms a framework adapted for attachment of the load carrying vanes.

13. A gas turbine engine component according to claim 1, wherein the stiffening structure comprises a plurality of sets of attachment portions, and the sets are spaced in the extension direction of the stiffening structure such that they match the distance between the load carrying vanes.

14. A gas turbine engine component according to claim 13, wherein 5 each set of attachment portions comprises a second portion extending in the extension direction of the stiffening structure.

15. A gas turbine engine component according to claim 13, wherein the component comprises a plurality of attachment members and each attachment member is adapted to connect one of the load carrying vanes to the attachment portion of the stiffening structure.

16. A gas turbine engine component according to claim 15; wherein the attachment member comprises two plate portions, which in cross section extend substantially at right angles to each other.

17. A gas turbine engine component according to claim 1, wherein each of the attachment means extends between and is attached to two adjacent load carrying vanes.

18. A gas turbine engine component according to claim 1, wherein the stiffening structure extends along an arc of a circle sector of at least 45.

19. A gas turbine engine component according to claim 1, wherein the stiffening structure extends continuously along the whole length of the arc of a circle.

20. A gas turbine engine component according to claim 1, wherein component comprises a load transferring element and that the load transferring element is directly connected to the stiffening structure.

21. A gas turbine engine component according to claim 20, wherein the load transferring element constitutes an engine mount.

22. A turbojet engine, wherein it is provided with a gas turbine engine component according to claim 1.

23. An aircraft, wherein it is provided with a turbojet engine according to claim 22.

24. A gas turbine engine component comprising
an outer ring element,
a plurality of circumferentially spaced load carrying vanes extending in a radial direction of the ring element,
a load transferring, element adapted to transfer loads at least one of to and from the load carrying vanes
a stiffening structure bridging the distance between at least two adjacent load carrying vanes in the circumferential direction of the ring element, and that the at least two adjacent load carrying vanes are attached to the stiffening structure,
the stiffening structure is positioned on a radial interior side of the ring element and
the load transferring element is directly connected to the stiffening structure.

25. A gas turbine engine component according to claim 24, wherein the stiffening structure forms a framework adapted for attachment of the load carrying vanes.

26. A gas turbine engine component according to claim 24, wherein the ring element comprises a wall with main surfaces facing in a radial direction.

27. A gas turbine engine component according to claim 24, wherein the outer ring element presents at least one radial opening through which the load transferring element extends.

28. A gas turbine engine component according to claim 24, wherein the load transferring element constitutes an engine mount.

29. A gas turbine engine component comprising at least one ring element, a plurality of circumferentially spaced arms extending in a radial direction of the ring element, and at least one attachment means adapted to attach at least one of the arms to the ring element, wherein the attachment means comprises a material that presents different properties in relation to at least one of the arm and the ring element, and the attachment means forms a stiffening structure bridging the distance between at least two adjacent arms in the circumferential direction of the ring element, wherein the at least one of the arm and the ring element has a main load carrying direction in parallel with its extension direction, and the at least one of the arm and the ring element has an internal structure with an anisotropic load carrying property, and the internal structure is configured so that the main load carrying direction is in parallel with the extension direction of the arm or the ring element, respectively.

30. A gas turbine engine component according to claim 29, wherein the at least one of the arm and the ring element comprises a composite material.

31. A gas turbine engine component according to claim 30, wherein the composite material comprises a plurality of fibres, the plurality of fibres for the at least one of the arm and the ring element extending in the extension direction of the at least one of the arm and the ring element, respectively.

32. A gas turbine engine component according to claim 29, wherein the attachment means forms a bracket.

33. A gas turbine engine component according to claim 29, wherein the attachment means comprises a material of a higher bending strength than the material of the at least one of the arm and the ring element.

34. A gas turbine engine component according to claim 29, wherein the attachment means comprises a material of a substantially isotropic internal structure.

35. A gas turbine engine component according to claim 29, wherein the attachment means comprises a metallic material.

36. A gas turbine engine component according to claim 29, wherein the arm is attached to both an outer ring element.

37. A gas turbine engine component according to claim 29, wherein stiffening structure extends continuously in a circumferential direction corresponding to the circumferential direction of the ring element.

38. A gas turbine engine component according to claim 29, wherein the stiffening structure extends along an arc of a circle sector of at least 45', preferably at least 90°, or most preferably at least 180.

39. A gas turbine engine component according to claim 29, wherein the stiffening structure extends continuously along the whole length of the arc of a circle.

40. A gas turbine engine component according to claim 29, wherein it the ring element is an outer ring element, and the at least one attachment means is attached to and connects the plurality of arms to the ring element, and the component comprises an engine mount provided on the outside of the outer ring element, the engine mount being attached to the at least one attachment means.

41. A gas turbine engine component according to claim 40, wherein the outer ring element presents at least one radial opening through which the engine mount extends.

42. A gas turbine engine component according to claim 29, wherein it comprises a plurality of the attachment means, each of which extends between and is attached to one of two adjacent arms of the plurality of arms.

43. A gas turbine engine component according to claim 29, wherein it comprises a plurality of the attachment means, each of which extends between and is attached to two adjacent arms of the plurality of arms.

44. A gas turbine engine component according to claim 29, wherein the at least one attachment means is attached by means of bolts to the ring element.

45. A gas turbine engine component according to claim 29, wherein the at least one attachment means is attached by means bolts to the plurality of arms.

46. A gas turbine engine component according to claim 29, wherein the plurality of arms constitute vanes of a fan of a turbojet engine.

47. A gas turbine engine component according to claim 29, wherein the plurality of arms comprises aerodynamic guide vanes.

48. A gas turbine engine component according to claim 29, wherein the plurality of arms comprises force-absorbing structural vanes.

49. A gas turbine engine component according to claim 29, wherein the attachment means forms an integral part of the ring element.

50. A gas turbine engine component comprising at least one ring element, a plurality of circumferentially spaced arms extending in a radial direction of the ring element, and at least one attachment means adapted to attach at least one of the arms to the ring element, wherein the at least one of the arm and the ring element has a main load carrying direction in parallel with its extension direction and the attachment means forms a stiffening structure bridging the distance between at least two adjacent arms in the circumferential direction of the ring element, wherein the at least one of the arm and the ring element has an internal structure with an anisotropic load carrying property, and that the internal structure is configured so that a main load carrying direction is in parallel with the extension direction of the arm or the ring element, respectively.

51. A gas turbine engine component according to claim 50, wherein the attachment means comprises a material that presents different properties in relation to the at least one of the arm and the ring element.

* * * * *